United States Patent [19]
Yoshinaga et al.

[11] Patent Number: 5,316,806
[45] Date of Patent: May 31, 1994

[54] INFORMATION MEMORY MEDIUM AND INFORMATION RECORDING/HOLDING PROCESS MAKING USE OF THE MEDIUM

[75] Inventors: Kazuo Yoshinaga, Machida; Koichi Sato, Sagamihara, both of Japan

[73] Assignee: Canon Kabushiki Kaisha, Tokyo, Japan

[21] Appl. No.: 985,437

[22] Filed: Dec. 3, 1992

Related U.S. Application Data

[63] Continuation of Ser. No. 712,553, Jun. 10, 1991, abandoned.

[30] Foreign Application Priority Data

Jun. 12, 1990 [JP] Japan .................. 2-151707
May 21, 1991 [JP] Japan .................. 3-144137

[51] Int. Cl.⁵ .................................................. C09K 19/00
[52] U.S. Cl. .................................................. 428/1; 428/64; 428/65; 428/913; 430/945; 346/1.1; 346/76 L; 359/93; 359/99; 359/100; 365/65; 365/145; 369/275.1
[58] Field of Search ............. 428/1, 913, 64, 65; 359/99, 100, 93; 365/145, 65; 369/275.1; 346/1.1, 76 L; 430/945

[56] References Cited

U.S. PATENT DOCUMENTS

| | | | |
|---|---|---|---|
| 4,293,435 | 10/1981 | Portugall | 428/1 |
| 4,367,924 | 1/1983 | Clark | 359/93 |
| 4,702,558 | 10/1987 | Coles | 350/351 |
| 4,855,976 | 8/1989 | Yamazaki | 369/13 |
| 4,904,065 | 2/1990 | Yuasa | 350/350 S |
| 4,988,460 | 1/1991 | Morita | 428/1 |
| 4,997,591 | 3/1991 | Heppke | 350/350 S |
| 5,024,784 | 6/1991 | Eich | 428/1 |
| 5,034,153 | 7/1991 | Uchida | 428/1 |

FOREIGN PATENT DOCUMENTS

| | | |
|---|---|---|
| 0271900 | 6/1988 | European Pat. Off. |
| 59-010930 | 1/1984 | Japan . |
| 59-035989 | 2/1984 | Japan . |
| 63-153216 | 7/1985 | Japan . |
| 62-107448 | 5/1987 | Japan . |
| 63-153520 | 6/1988 | Japan . |
| 63-266647 | 11/1988 | Japan . |
| 63-271228 | 11/1988 | Japan . |
| 318526 | 12/1988 | Japan .......... 350/350 S |
| 62-154340 | 7/1989 | Japan . |

OTHER PUBLICATIONS

Patent Abstracts of Japan, vol. 13, No. 54, (Feb. 8, 1989) (P-824)(3402).
Nakamura, et al., "Ferroelectric liquid-crystal light valve addressed by laser heating," Journal of Applied Physics, 67(2), 996, 1990.

*Primary Examiner*—Alexander S. Thomas
*Assistant Examiner*—Nasser Ahmad
*Attorney, Agent, or Firm*—Fitzpatrick, Cella, Harper & Scinto

[57] ABSTRACT

Provided is an information memory medium comprising a recording layer containing a polymeric liquid crystal having a ferroelectric chiral smectic phase, wherein said polymeric liquid crystal comprises a polymeric liquid crystal having a temperature region, in which its electric-field response time changes by the factor of not less than 200 times, within a temperature range of the ferroelectric chiral smectic phase on the side of higher temperatures than its glass transition temperature.

10 Claims, 6 Drawing Sheets

FIG. 2A
FIG. 2B
FIG. 2C
FIG. 2D
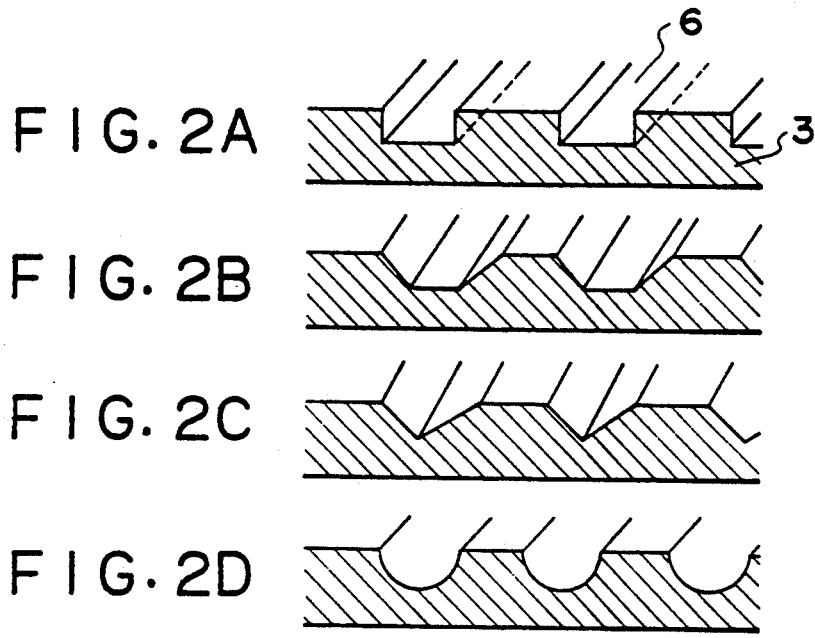
FIG. 3
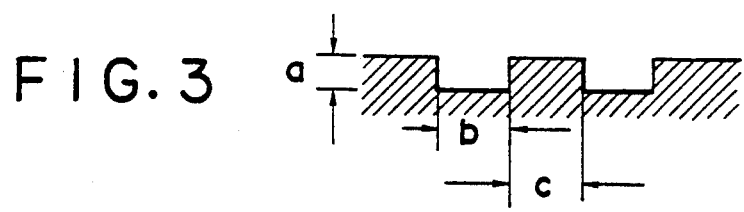
FIG. 4
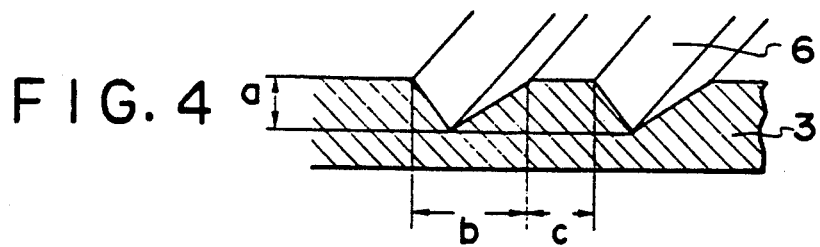

INFORMATION MEMORY MEDIUM AND INFORMATION RECORDING/HOLDING PROCESS MAKING USE OF THE MEDIUM

This application is a continuation of application Ser. No. 712,553, filed Jun. 10, 1991, now abandoned.

BACKGROUND OF THE INVENTION

1. Field of the Invention

The present invention relates to an information memory medium making use of a polymeric liquid crystal. More particularly, it relates to an information memory medium utilizing a ferroelectric chiral smectic phase of a polymeric liquid crystal. It also relates to an information recording/holding process making use of such a medium.

2. Related Background Art

Optical recording methods have been hitherto put into practical use as methods that can provide a large capacity and can achieve superior random access. In particular, researches on rewritable type optical disks are being pushed forward, and it is attempted to put into practical use those utilizing photomagnetic effect and those utilizing phase changes. Of these mediums, polymeric liquid crystals are proposed also as materials for information memory mediums (Japanese Patent Applications Laid-open No. 59-10930, No. 59-35989 and No. 62-154340). In particular, as a recording method, a method is proposed in which spiral pitch lengths of a cholesteric polymeric liquid crystal are changed or pits are formed in the state of no alignment to change optical reflectance in multi value (Japanese Patent Applications Laid-open No. 62-107448 and No. 62-12937).

The above information memory mediums making use of polymeric liquid crystals, however, have so low an erasing speed that it has been questioned for them to be put into practical use. In order to solve such a problem, for example, information memory mediums utilizing a ferroelectric polymeric liquid crystal are proposed (Japanese Patent Applications Laid-open No. 63-153520, No. 63-266647 and No. 63-271228). These utilize glass transition points for carrying out the information recording/holding process.

On the other hand, taking note of high-speed response, an information memory medium utilizing surface stabilization effect of a low-molecular ferroelectric liquid crystal is also proposed (Journal of Applied Physics, 67, p.996, 1990).

The above conventional techniques, however, have been disadvantageous in that, as in the former techniques, the electric-field response speed is lowered and no high response speed can be sufficiently achieved when the glass transition temperature of the ferroelectric liquid crystal is made sufficiently higher than the room temperature so that recorded data can be stably held.

In the latter technique in which the surface stabilization effect of a low-molecular ferroelectric liquid crystal is utilized, no recording layer can be retained unless the medium has a cell structure, and also the cell must be constructed with a cell thickness of about 1 μm. This has brought about a difficult problem on the manufacture. In addition, the recorded data are unstable compared with those of the mediums in which the polymeric liquid crystals are used, and hence unsuitable for their long-term storage, disadvantageously.

SUMMARY OF THE INVENTION

An object of the present invention is to provide an information memory medium in and from which data can be written and erased at a high speed and in which recorded data can be stably held at room temperature, and also to provide an information recording/holding process making use of such a medium.

The present invention provides an information memory medium comprising a recording layer containing a polymeric liquid crystal having a ferroelectric chiral smectic phase, wherein said polymeric liquid crystal comprises a polymeric liquid crystal having a temperature region, in which the electric-field response time changes by the factor of not less than 200 times, within a temperature range of the ferroelectric chiral smectic phase on the side of higher temperatures than its glass transition temperature.

The present invention also provides an information recording/holding process, comprising the step of recording information on said information memory medium in its ferroelectric chiral smectic phase by applying heat and voltage, and the step of holding the recorded information.

BRIEF DESCRIPTION OF THE DRAWINGS

FIGS. 2A to 2D are diagrammatic cross sections of the forms of grooves made in recording layers.

FIGS. 3 and 4 are dimensional illustrations of the grooves made in recording layers.

DESCRIPTION OF THE PREFERRED EMBODIMENTS

Figure 1:
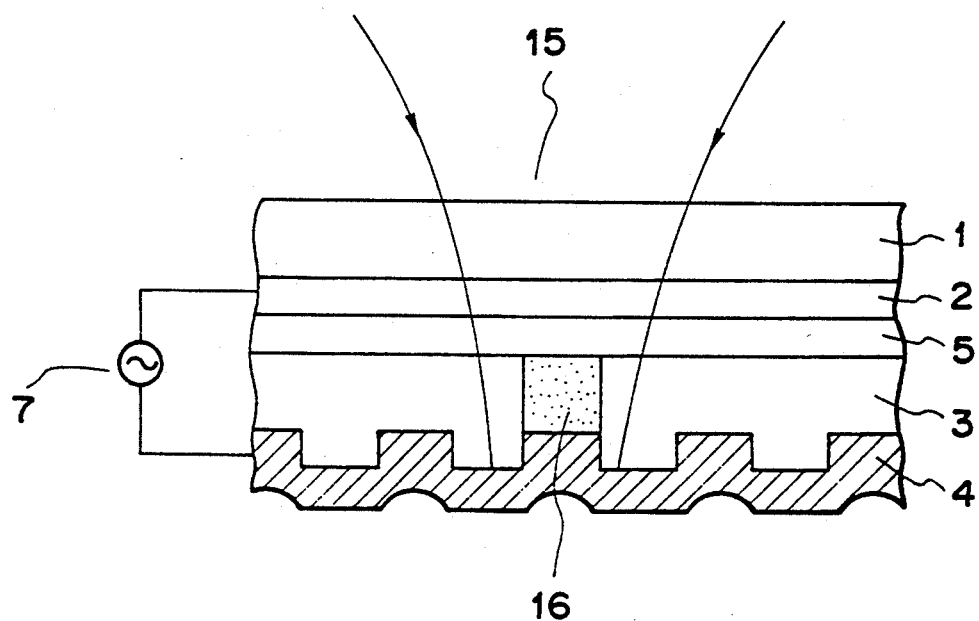
FIG. 1 is a partial cross section to illustrate an example of the information memory medium according to the present invention.

The information memory medium of the present invention comprises a recording layer in which a polymeric liquid crystal having a ferroelectric chiral smectic phase is used. The polymeric liquid crystal should preferably have a glass transition temperature not higher than the temperature at which recorded information is held (hereinafter referred to as memory holding temperature). The high-temperature side transition temperature (Curie temperature) at which ferroelectric properties disappear should preferably be 50° C. to 250° C. A temperature less than 50° C. is not preferred because a temperature difference from room temperature becomes so excessively small that it is impossible to achieve both the recording stability and the response speed. A temperature exceeding 250° C. is also not preferred because the polymeric liquid crystal tends to become deteriorated to make it difficult to repeat recording and erasing, also resulting in a lowering of recording sensitivity. The temperature may more preferably be in the range of 80° C. to 200° C.

In the polymeric liquid crystal having a ferroelectric chiral smectic phase, used in the present invention, its glass transition temperature is not higher than the memory holding temperature, and preferably not higher than −10° C., in order to achieve a high-speed response. Here, the memory holding temperature should preferably be room temperature (25° C. to 35° C.).

In the present invention, a polymeric liquid crystal having a crystal phase transition point higher than the memory holding temperature is not preferred because the state wherein information is recorded or erased as a result of voltage application may undergo destruction or deterioration. The polymeric liquid crystal should more preferably have no crystal phase transition point higher than the glass transition temperature.

In the information memory medium of the present invention, comprising the recording layer containing the polymeric liquid crystal having a ferroelectric chiral smectic phase, a voltage is applied in a heated state to select a recorded state, followed by cooling, so that the recorded state can be kept. In this instance, a polymeric liquid crystal is used having a temperature region, in which its electric-field response time changes by the factor of not less than 200 times, within a temperature range of the ferroelectric chiral smectic phase (i.e., the temperature range pertaining to the chiral smectic phase showing ferroelectric properties) on the side of higher temperatures than its glass transition temperature. This makes it possible to obtain an information memory medium capable of holding recorded information in an excellent state which has never before been available. Use of the medium of the present invention enables application of an information recording/holding process by which recorded information can be held in an excellent state without utilization of the glass transition point. In the present invention, in order to carry out a writing (or an erasing) that utilizes ferroelectric properties, it is necessary to set a writing (or erasing) temperature within the temperature range of a chiral smectic phase (in particular, chiral smectic C phase) showing ferroelectric properties. The memory holding temperature, however, may be within the temperature range of any chiral smectic phases, even if it, for example, may be outside the temperature range of the chiral smectic C phase. Information can be recorded or erased at a high speed when it is recorded or erased at a temperature in the vicinity of the Curie point. Hence, in particular, stated specifically, it is preferred to select a recording layer having a temperature region, in which a response time increases by the factor of not less than 200 times as compared with a response time at the Curie point, the temperature at which information is written (or erased).

The information memory medium constituted in this way can give an information memory medium capable of stably keeping a recorded state without influence of reversal electric fields caused in the interior of polymeric liquid crystals.

More preferably, the response time should increase by the factor of 300 times or more, whereby it becomes more possible to achieve a high-speed response and keep a stable recorded state.

When in this instance the electric-field response time changes by the factor of at least twice per 10 degrees of temperature, it also becomes possible to apply an electric field in a shorter time, enabling modulation at a high speed. The response time should more preferably change by the factor of at least three times per 10 degrees of temperature.

The polymeric liquid crystal having a ferroelectric chiral smectic phase, used in the present invention, can be any of homopolymers and copolymers so long as they can satisfy the characteristics described above.

It, however, has been hitherto difficult to obtain polymeric liquid crystal compounds having such characteristics. This is due to the fact that although those having an elongated flexible spacer chain and a flexible main-chain polymer must be used in order to control the glass transition temperature to be not higher than −10° C., such polymers tend to cause crystal phases and it has been difficult to change the response time by the factor of 200 times or more. An attempt to obtain a broad chiral smectic phase temperature range requires the use of a tricyclic mesogen. This also tends to cause a crystal phase, and it has been difficult to change the response time by the factor of 200 times or more.

In the present invention, in order to solve such a problem, copolymers are particularly preferably used. In this case, for example, those having a long flexible spacer chain and those having a short one may be used in combination or those having a bicyclic mesogen group and those having a tricyclic one may be used in combination so that any suitable combination can be selected. Those satisfying the above characteristics can be thus obtained.

Herein the flexible spacer chain refers to a group that connects mesogen groups. Those having 4 to 16 carbon atoms are used as preferred flexible spaces.

Structures usable as the copolymer can be exemplified by the following. In the following formulas, p is an integer of from 5 to 1,000, and q is an integer of from 1 to 18. In the formulas (1) and (2), R represents —H or —CH$_3$.

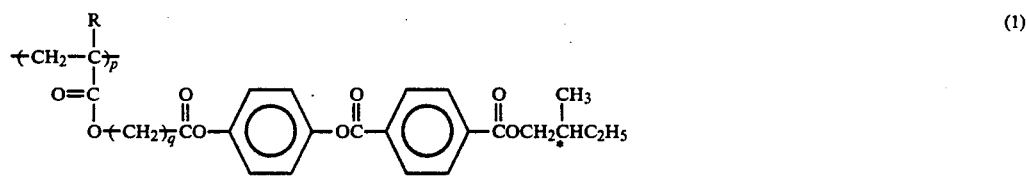

(1)

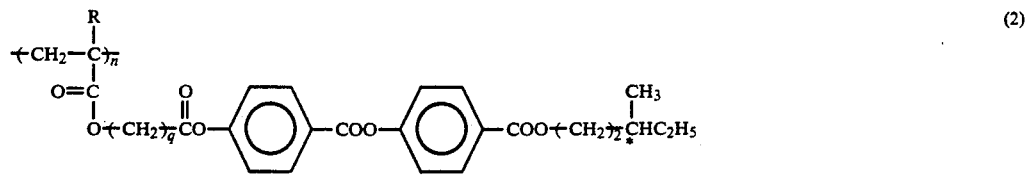

(2)

-continued
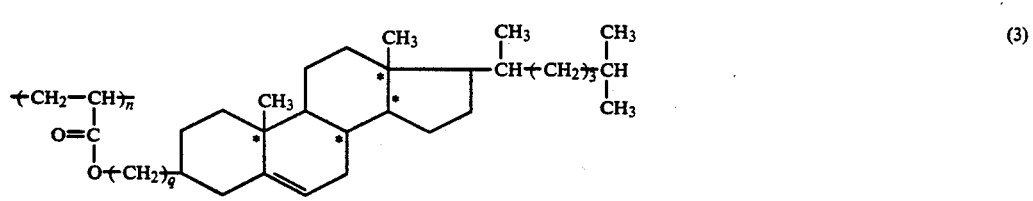 (3)
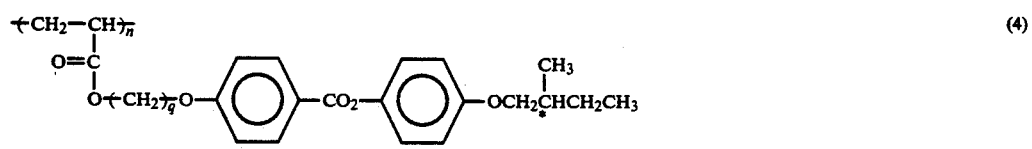 (4)
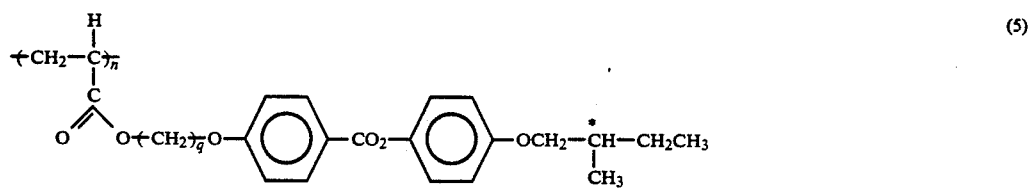 (5)
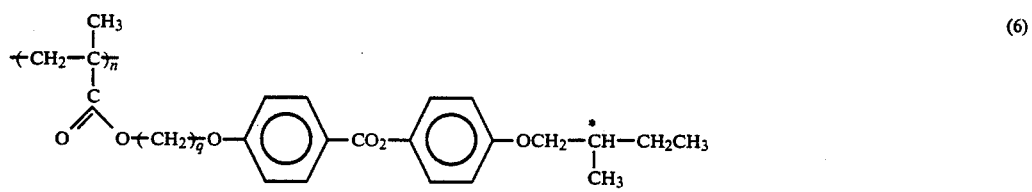 (6)
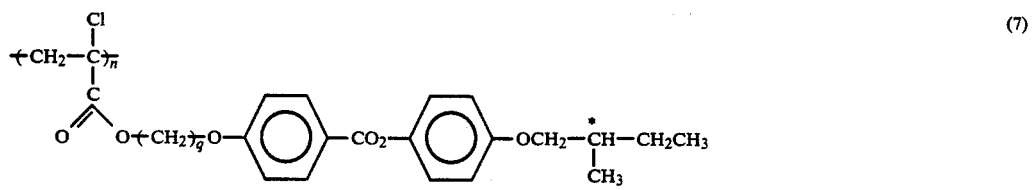 (7)
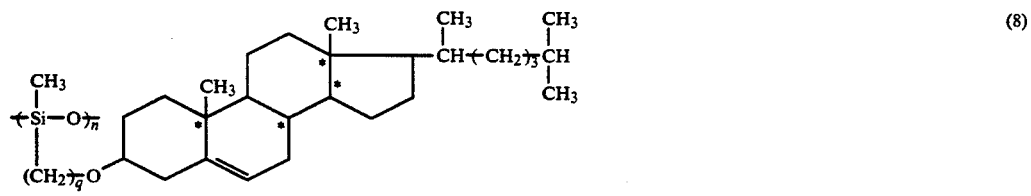 (8)
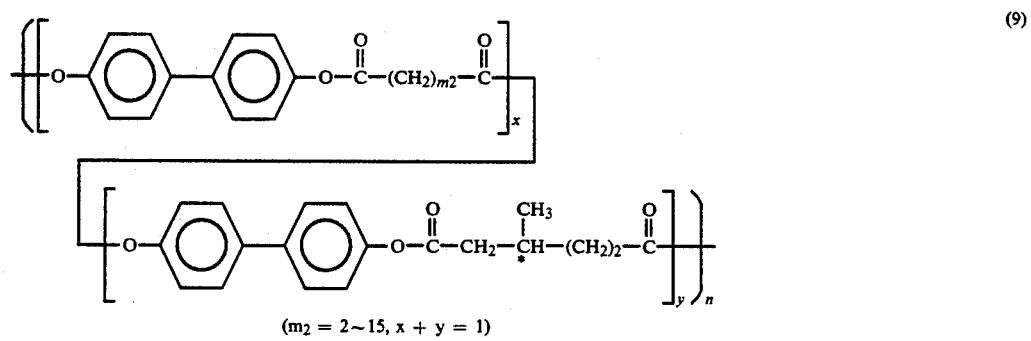 (9)
($m_2 = 2 \sim 15$, $x + y = 1$)

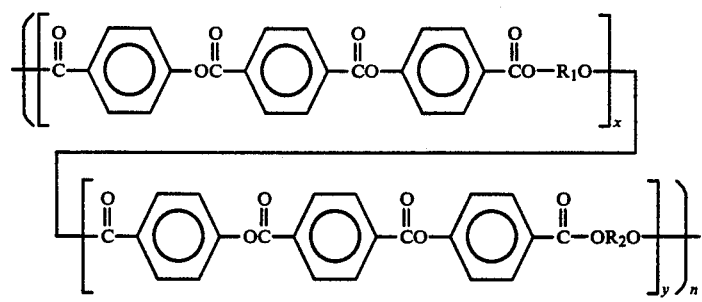
(10)
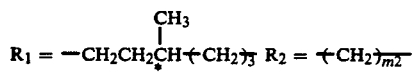
(x + y = 1, m₂ = 2~15)
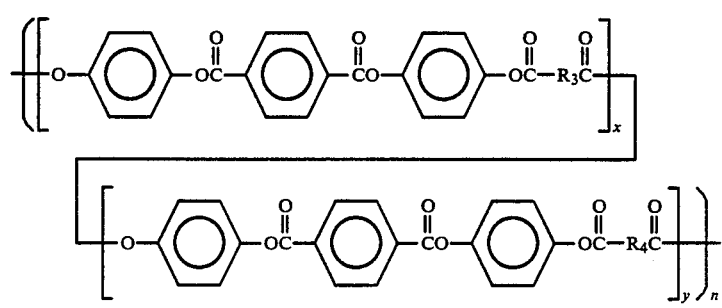
(11)
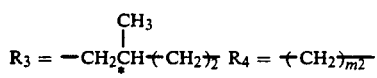
(x + y = 1, m₂ = 2~15)
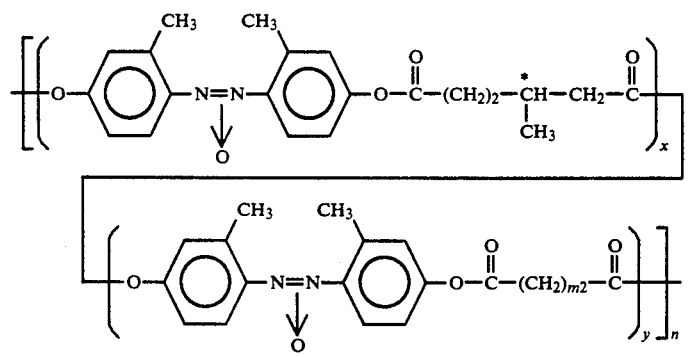
(12)
(x + y = 1, m₂ = 2~15)
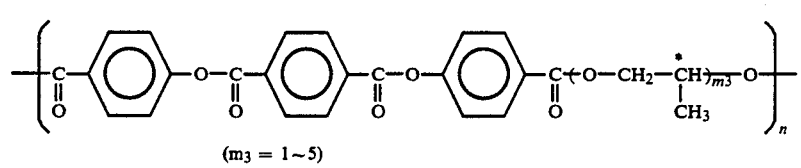
(13)
(m₃ = 1~5)
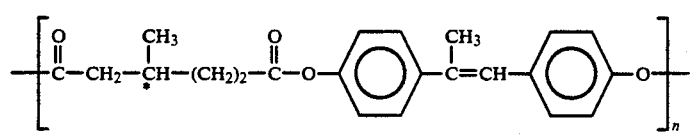
(14)
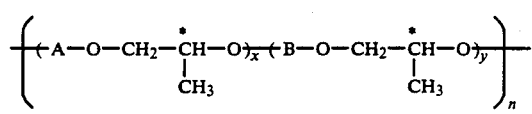
(15)

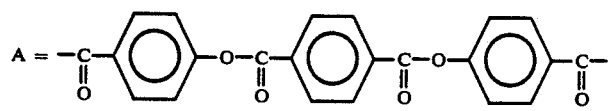
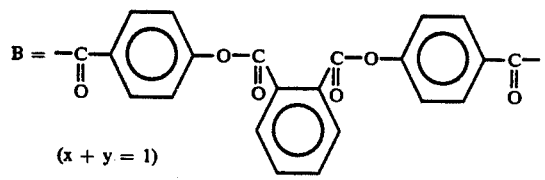
(x + y = 1)
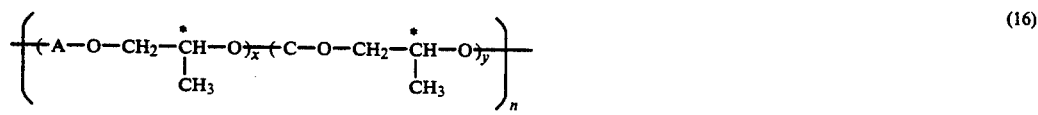 (16)
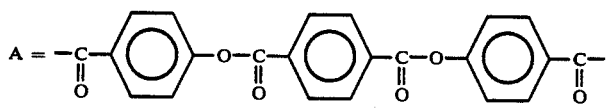
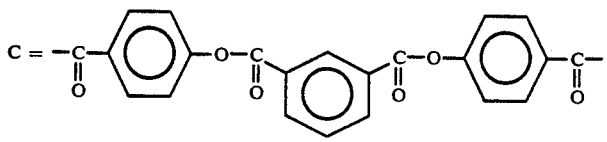
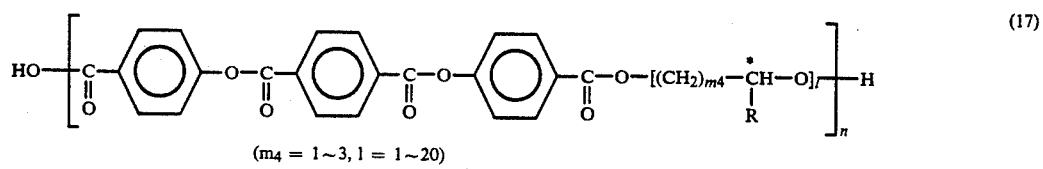 (17)
($m_4 = 1\sim3$, $l = 1\sim20$)
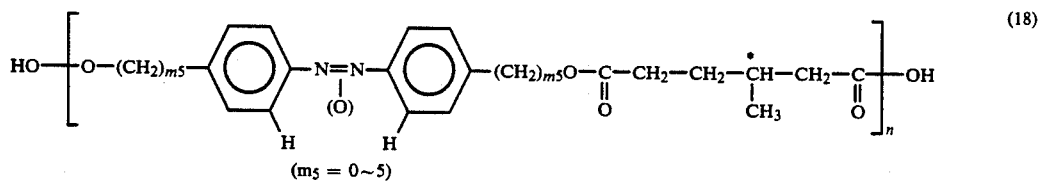 (18)
($m_5 = 0\sim5$)
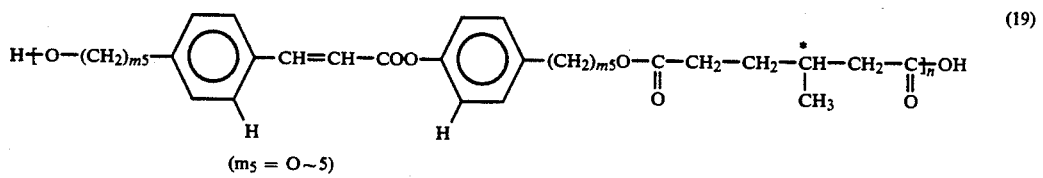 (19)
($m_5 = 0\sim5$)
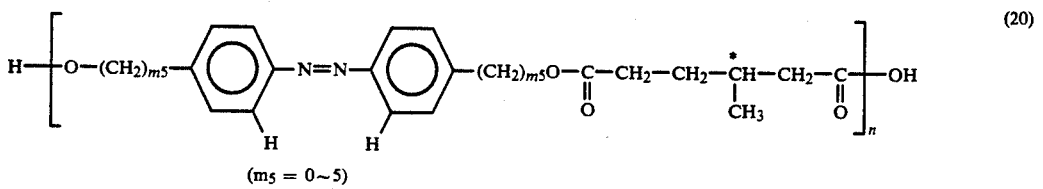 (20)
($m_5 = 0\sim5$)

-continued

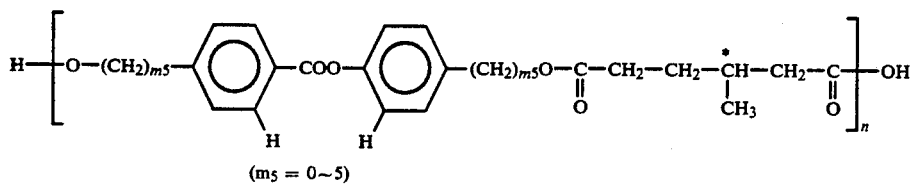

(m₅ = 0~5)

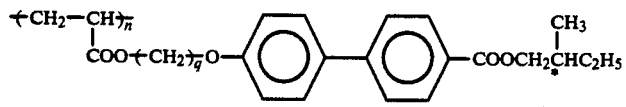

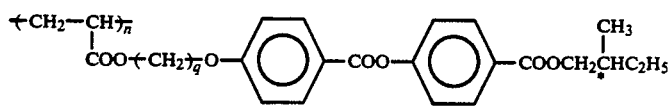

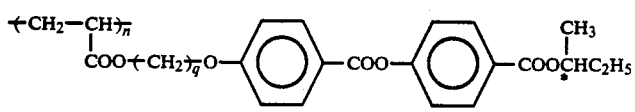

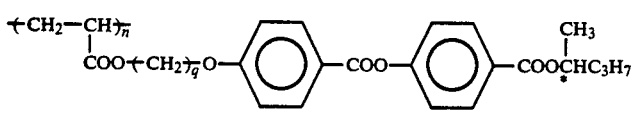

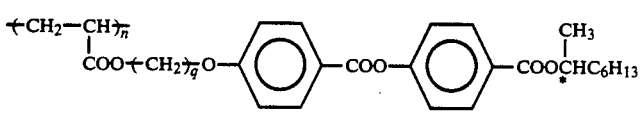

In the following formulas, $m_6$ is an integer of from 1 to 18.

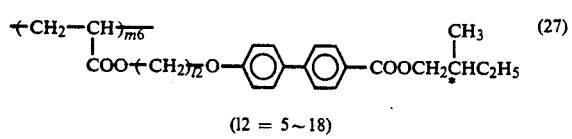

(l2 = 5~18)

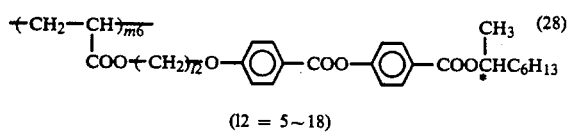

(l2 = 5~18)

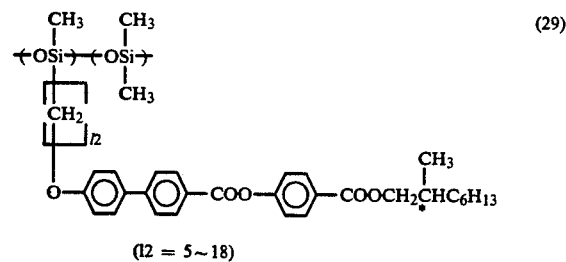

(l2 = 5~18)

In instances in which information is written or erased using laser light or the like, a laser light absorptive layer may be further provided or a laser light absorptive compound may be added to the recording layer containing the polymeric liquid crystal compound. Sensitivity can thereby be improved. The laser light absorptive compound added to the recording layer containing the polymeric liquid crystal can be exemplified by azo compounds, bisazo compound, trisazo compounds, anthraquinone compounds, naphthoquinone compounds, phthalocyanine compounds, naphthalocyanine compounds, tetrabenzoporphyrin compounds, aminium salt compounds, diimonium salt compounds, and metal chelate compounds.

Of the above laser light absorptive compounds, compounds used for semiconductor lasers have an absorption in the near infrared region and are useful as stable light absorptive coloring matters. They also have good compatibility with or dispersibility to the polymeric liquid crystal compounds. Some of them have dichroic properties. Upon mixing such compounds having dichroic properties in the polymeric liquid crystal, it also becomes possible to obtain a thermally stable, host-guest type memory and display medium.

In the polymeric liquid crystal compound, two or more kinds of the above compounds may be contained.

The above compound may also be used in combination with other near infrared absorptive coloring matters or dichroic coloring matters. The near infrared absorptive compounds preferably usable in combination can be exemplified by cyanine dyes, merocyanine dyes, phthalocyanine dyes, tetrahydrocholine dyes, dioxazine dyes, anthraquinone dyes, triphenodithiazine dyes, xanthene dyes, triphenylmethane dyes, pyrylium dyes, croconium dyes, azulene dyes, and triphenylamine dyes.

The above compound may be added to the polymeric liquid crystal in an amount of about 0.1% by weight to 20% by weight, and preferably 0.5% by weight to 10% by weight. The polymeric liquid crystal compound used in the present invention is a polymeric thermotropic liquid crystal, which utilizes an intermediate phase, i.e., nematic, smectic, chiral smectic or cholesteric phase.

FIG. 1 is a cross section to illustrate an example of the information memory medium according to the present invention. As shown in the drawing, the information memory medium of the present invention comprises a substrate 1 comprised of a disk-like, card-like or tape-like glass plate or plastic plate, and a transparent electrode 2 formed thereon in a plane or given pattern.

The substrate 1 provided with such a transparent electrode 2 may be further provided with an alignment control film 5, which can be obtained by film formation using, for example, an inorganic insulating material such as silicon monoxide, silicon dioxide, aluminum oxide, zirconia, magnesium fluoride, cerium oxide, cerium fluoride, silicon nitride, silicon carbide or boron nitride, or an organic insulating material such as polyvinyl alcohol, polyimide, polyamidoimide, polyester imide, polyparaxylene, polyester, polycarbonate, polyvinyl acetal, polyvinyl chloride, polyamide, polystyrene, cellulose resin, melamine resin, urea resin or acrylic resin.

This alignment control film 5 can be obtained by forming a film of the inorganic insulating material or organic insulating material described above, and thereafter rubbing the surface of the film in one direction by using velvet, cloth or paper.

In another preferred embodiment of the present invention, the alignment control film 5 can also be obtained by forming a film of an inorganic material such as SiO or $SiO_2$ on the substrate 1 by oblique vacuum deposition.

In still another embodiment, the inorganic insulating material or organic insulating material described above may be formed into a film on the surface of the substrate 1 made of glass or plastic and thereafter the surface of the film may be etched by oblique etching, so that an alignment control effect can be imparted to the surface.

The above alignment control film 5 may preferably be made to have a function of an insulating film at the same time. For this purpose, this alignment control film 5 may have a layer thickness set in the range of usually 100 Å to 1 μm, and preferably 500 Å to 5,000 Å. This insulating layer is advantageous in that it can prevent occurring electric currents due to impurities contained in the recording layer 3 in a trace amount. Hence, there is no possibility of deteriorating the polymeric liquid crystal compound even after it has been operated repeatedly by many times.

In the present invention, means for surely carrying out molecular arrangement of the polymeric liquid crystal compound contained in the recording layer may preferably include stretching such as monoaxial stretching, biaxial stretching or inflation stretching, and rearrangement by shearing. It is effective in view of manufacture to carry out shearing when embossed using a stamper or the like. If the material has no film-forming properties and it is difficult to carry out stretching alone, such a material may be sandwiched between films and then stretched together with them to obtain the desired alignment.

As other methods for alignment, it is possible to carry out alignment using an electric field or magnetic field, and alignment by shearing.

In the information memory medium as described above, a recording/erasing process may comprise heating the recording layer aligned in the manner described above, and making arrangement of polarization in a given direction by means of a voltage applying device 7, followed by cooling to effect initialization. Next, while applying a voltage reverse to the voltage used for initialization, by means of the voltage applying device 7, a heating laser light 15 is applied to select a record area 16 as shown in FIG. 1. Thereafter, the heating laser light 15 is removed, followed by cooling. As a result, the record area 16 has an arrangement of polarization reverse to that in the initialization and is fixed. This state is very stable at room temperature and does not change when a voltage is applied from the device 7.

FIGS. 2A to 2D show examples of the form of grooves 6 made in the recording layer 3 provided on the substrate 1 and containing the polymeric liquid crystal. From the results of experiments, it has been confirmed that, as to the size of the grooves 6 exemplified in FIGS. 3 and 4, i.e., the groove depth a, the groove width b and the groove land width c, the grooves 6 may each preferably have a groove depth a of from 0.05 μm to 0.2 μm, a groove width b of from 0.5 μm to 2.0 μm and a groove land width c of from 0.5 μm to 2.0 μm, and particularly preferably a groove depth a of from 0.1 μm to 0.2 μm, a groove width b of from 0.5 μm to 1.0 μm and a groove land width c of from 1.0 μm to 2.0 μm. However, even when all the above three conditions are not satisfied, at least the groove depth among the above conditions may be set within the above range, whereby the intended effect can still be obtained. It has been also confirmed that the forms of grooves have not so much influence.

Figure 5:
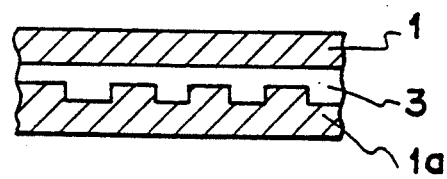
FIGS. 5 and 6 are diagrammatic partial cross sections of the information memory mediums according to the present invention.

An information memory medium produced using specific disk substrates as described above can provide an information memory medium in which the liquid crystal is uniformly aligned in the direction of a spiral groove or concentric grooves when the temperature of the polymeric liquid crystal layer held between the substrates is raised to a temperature higher than its isotropic liquid temperature and then gradually cooled to effect alignment. Such a disk may be constituted, as in the cross section shown in FIG. 5, to have a structure that the recording layer 3 is held between substrates only one of which, a substrate 1a, is provided with grooves and the other of which, a substrate 1, is a flat plate. A liquid crystal layer desirably aligned can be obtained if at least one of them has the groove form according to the present invention. The groove or grooves can be formed by the transfer method using a stamper or by injection molding.

Figure 6:
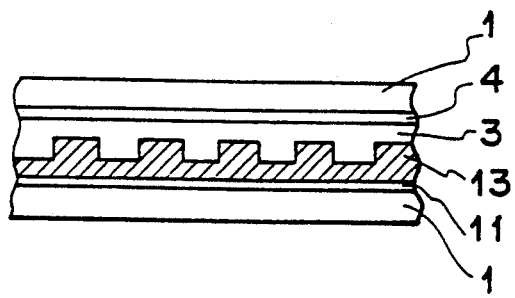

As shown in FIG. 6, the disk may also be so constituted that an electric field can be applied. As an example, the disk shown in FIG. 6 has a cross sectional structure comprising a substrate 1, a conductive film 11 such as an ITO (indium-tin oxide) deposited film provided on the substrate 1, a film 13 with a groove structure, formed on the conductive film 11, and the recording layer 3 containing the polymeric liquid crystal compound, held between the substrate 1 and another substrate 1 provided with a conductive film (a reflective layer 4).

Figure 7:
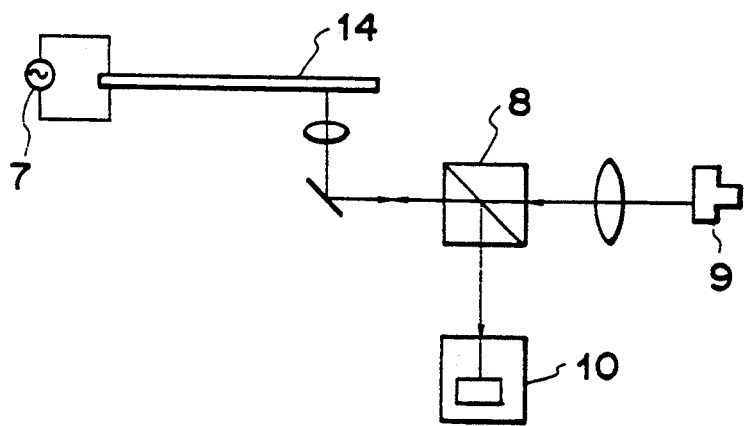
FIG. 7 is a schematic view of a recording-reproducing apparatus in which the information memory medium of the present invention is used.

FIG. 7 schematically illustrates an apparatus for recording-reproducing information, making use of the information memory medium of the present invention. When information is recorded, a semiconductor laser beam 9 is shot to the information memory medium 14 through an optical system. When the recorded information is reproduced, the semiconductor laser beam 9 is applied once to the information memory medium 14 and then the light having returned is read on an optical sensor 10 through a beam splitter 8.

The present invention will be described below in greater detail by giving Examples.

EXAMPLE 1

Monomers represented by the following structural formulas (I) and (II) were dissolved in dry toluene in amounts of 0.63 g and 0.67 g, respectively, and then 3 mol % of AIBN (azobisisobutylonitrile) was added to the solution to carry out freeze deaeration, followed by reaction carried out at 60° C. for 24 hours. Reprecipitation was repeated in methanol to give 0.68 g of a copolymer (Yield: 52%).

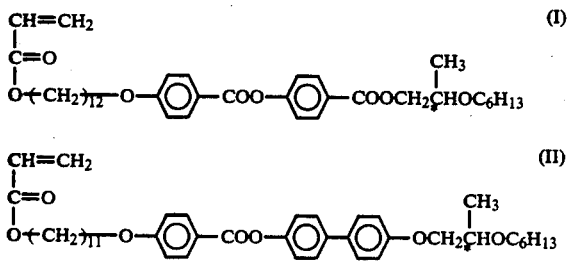

The resulting polymeric liquid crystal copolymer had the following physical properties. Molecular weight measured by GPC:
Number average molecular weight: 9,400
Weight average molecular weight: 12,700
Phase transition temperatures (°C):

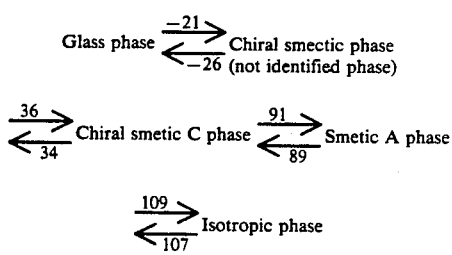

Specific rotatory power: $[\alpha]_D^{25} = +8.9°$ (chloroform)

Figure 8:
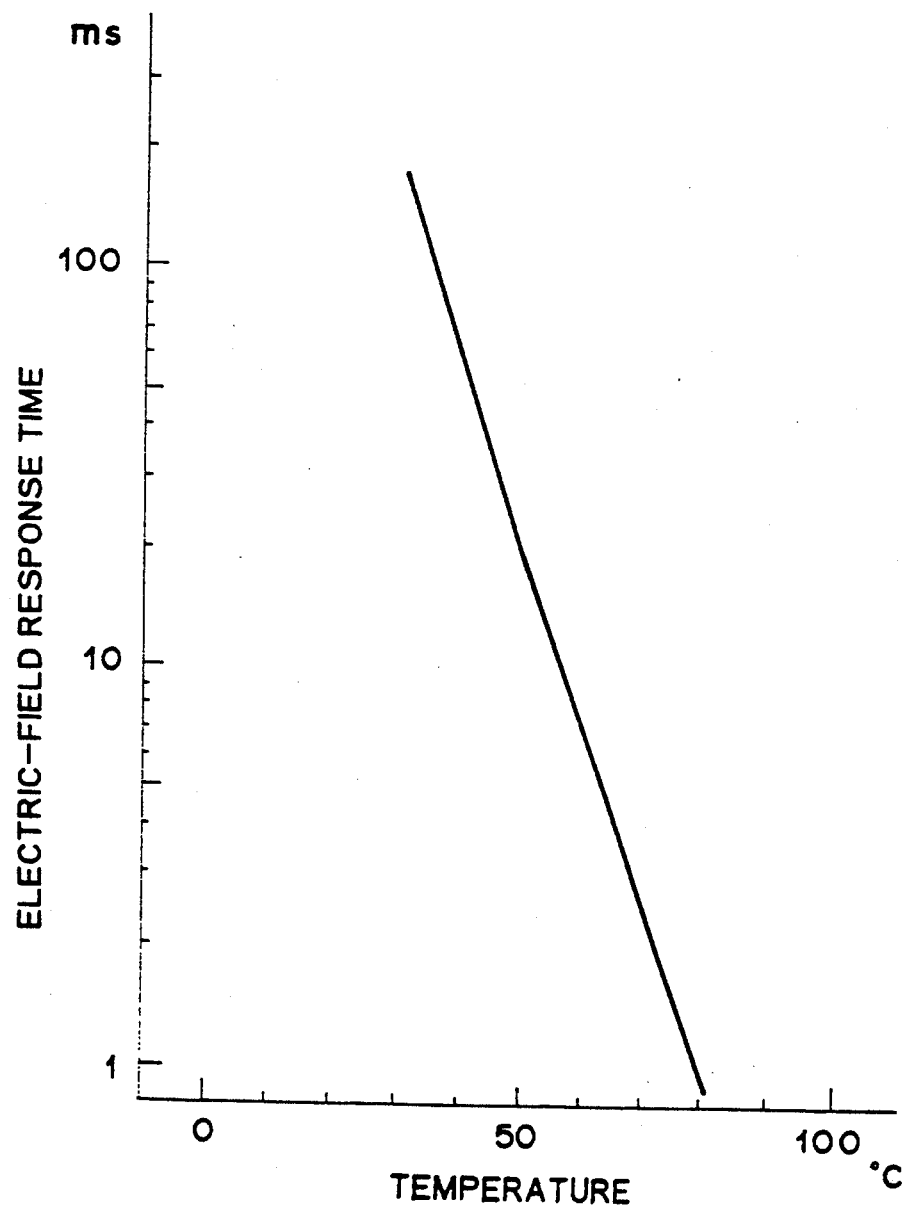
FIG. 8 is a graph to show temperature dependence of electric-field response time of a polymeric liquid crystal used in Example 1.

FIG. 8 shows temperature dependence of an electric-field response time of the polymeric liquid crystal copolymer thus obtained. As is seen from FIG. 8, in this polymeric liquid crystal copolymer the electric-field response time has changed by the factor of about 250 times within the temperature range of from 35° C. (response time: 120 msec) to 85° C., a chiral smectic phase temperature (response time: 480 μsec), under conditions of an applied voltage of ±40 V and a layer thickness of 1 μm.

Next, the resulting polymeric liquid crystal copolymer was dissolved in chloroform in a concentration of 20% by weight, and a near-infrared absorptive dye (NIR-13; available from Yamamoto Chemical Ind. Co., Ltd.) was further added in an amount of 1.5% by weight based on the polymeric liquid crystal copolymer.

Next, on a card-like glass substrate having been vacuum-deposited with aluminum in a thickness of 3,000 Å, a polyimide aligning film (a high-purity polyimide vanish, SAN-EVER 100; available from Nissan Chemical Industry Co., Ltd.) was formed in a thickness of 500 Å, to which monoaxial alignment was imparted by rubbing. The same treatment was applied also to the other glass substrate having been vacuum-deposited with ITO in a thickness of 1,000 Å. On the glass substrate with the ITO film, the polymeric liquid crystal solution previously obtained was applied by spin costing, followed by drying to form a layer with a thickness of 1 μm. On the resulting layer, the above glass substrate with the aluminum film was contact-bonded, followed by heating, cooling, and then alignment by shearing. An information memory medium was thus obtained.

A voltage of +40 V was applied to the upper and lower substrates of the information memory medium thus obtained, and the medium was cooled from 90° C. (near the Curie point) to effect initialization. Next, a voltage of −40 V was applied to the upper and lower substrates at room temperature, and, using a semiconductor laser with an output of 5 mW and an oscillation wavelength of 830 nm, the medium was irradiated with focused light in the form of 10 msec pulses. As a result, the polarization at the area irradiated therewith was reversed and the molecular alignment axes were rotated by 40°. It was thus possible to record informations.

The recorded informations were reproduced under crossed nicols, using a semiconductor laser with an output of 0.5 mW and an oscillation wavelength of 830 nm. As a result, the reflectance was 60% at the initialized areas and 10% at the record areas, and thus the product was confirmed to be preferably usable as an information memory medium. Then, even after storage at room temperature (25° C.) for 1 month, the record areas caused no change.

EXAMPLES 2 AND 3

Information memory mediums were produced in the same manner as in Example 1 except that the layer thickness of each recording layer was changed. The resulting information memory mediums were tested in the same manner as in Example 1 to examine the stability of recorded states. Results obtained are shown in Table 1.

TABLE 1

|  | Layer thickness (μm) | Room temperature (25° C.) |
|---|---|---|
| Example 2: | 5 | No change after a month |
| Example 3: | 10 | No change after a month |

EXAMPLE 4

Tetraisopropyl titanate (0.0015 g) was added to a mixture of 3.0 g of diethyl-4,4′-biphenyldicarboxylate, 1.3 g of a diol represented by the following formula (III) and 1.0 g of a diol represented by the following formula (IV) to be reacted under atmosphere of N₂, at 150° C. for an hour with stirring. Next, temperature was raised to 230° C. with reduction of pressure, and the reaction was carried out for 5 hours before the reaction was completed at a final pressure reduced to 0.5 mmHg.

The reaction product was dissolved in chloroform and the solution was put into methanol to repeat reprecipitation, followed by drying under reduced pressure to give 2.5 g of a white copolymer.

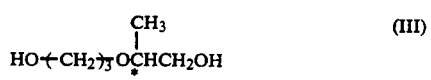

The resulting polymeric liquid crystal copolymer had the following physical properties. Molecular weight measured by GPC:
Number average molecular weight: 6,400
Weight average molecular weight: 11,000
Phase transition temperatures (°C):

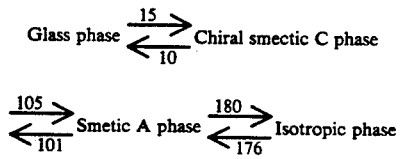

Specific rotatory power: $[\alpha]_D^{25} = +4.5°(C = 1.05,$ chloroform)

Figure 9:
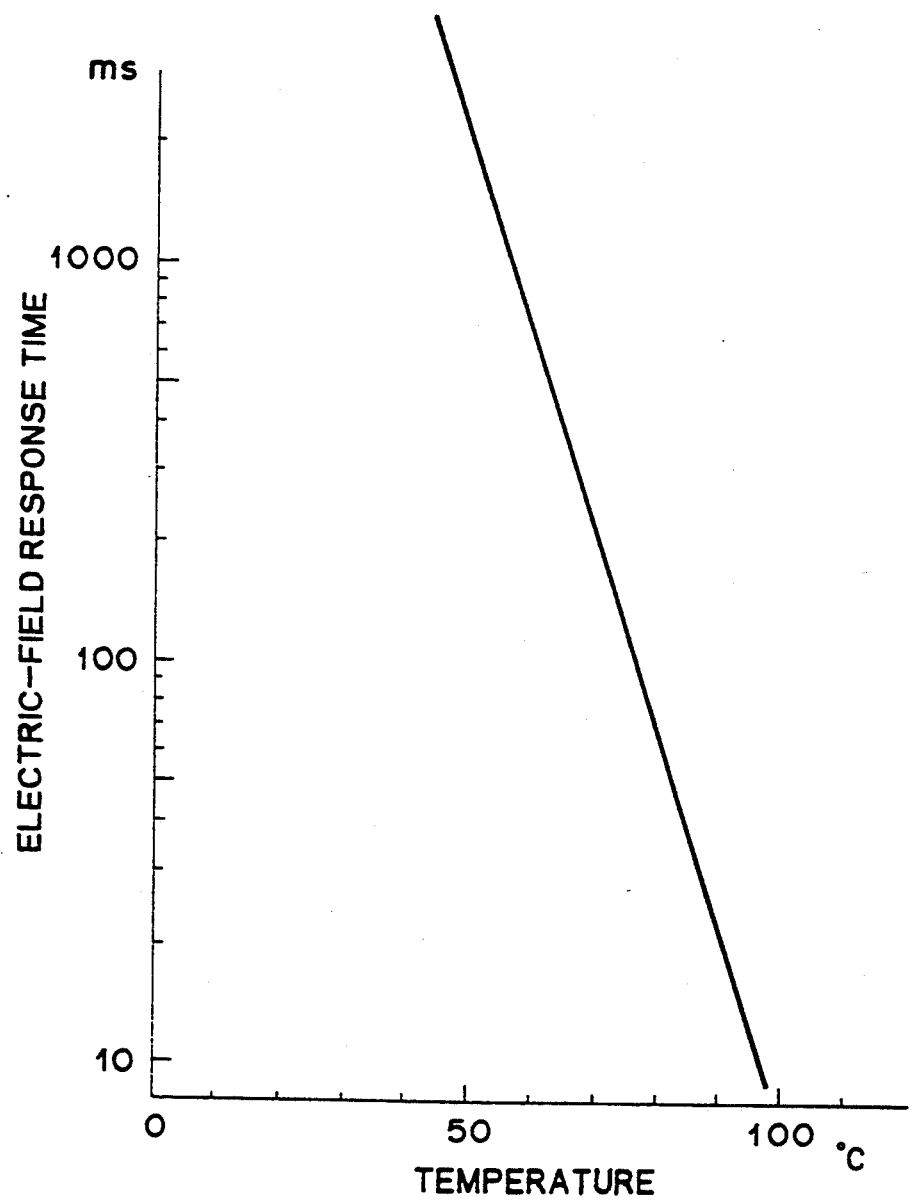
FIG. 9 is a graph to show temperature dependence of electric-field response time of a polymeric liquid crystal used in Example 4.

FIG. 9 shows temperature dependence of an electric-field response time of the polymeric liquid crystal copolymer thus obtained. As is seen from FIG. 9, in this polymeric liquid crystal copolymer the electric-field response time has changed by the factor of about 400 times within the temperature range of from 45° C. (response time: 3 sec) to 100° C., a chiral smectic phase temperature (response time: 7 nsec), under conditions of an applied voltage of ±40 V and a layer thickness of 1 μm.

The polymeric liquid crysal copolymer was dissolved in chloroform in a concentration of 20% by weight, and a near-infrared absorptive dye (NIR-13; available from Yamamoto Chemical Ind. Co., Ltd.) was further added in an amount of 1.5% by weight based on the polymeric liquid crystal.

The resulting liquid crystal, which was held between the same substrates as in Example 1, was subjected to aligning treatment.

Next, a voltage of +40 V was applied to the upper and lower substrates of the information memory medium thus obtained, and the medium was cooled from 120° C. to effect initialization.

Next, a voltage of −40 V was applied to the upper and lower substrates at room temperature, and, using a semiconductor laser with an output of 5 mW and an oscillation wavelength of 830 nm, the medium was irradiated with focused light in the form of 50 msec pulses. As a result, the polarization at the area irradiated therewith was reversed and the molecular alignment axes were rotated by 30°. It was thus possible to record information.

The recorded information was reproduced under crossed nicols, using a semiconductor laser with an output of 0.5 mW and an oscillation wavelength of 830 nm. As a result, the reflectance was 65% at the initialized areas and 20% at the record areas. Even after storage at 30° C. for a month, the record areas caused no change.

EXAMPLE 5

On the information memory medium used in Example 1, information was recorded under the same conditions.

Figure 10:
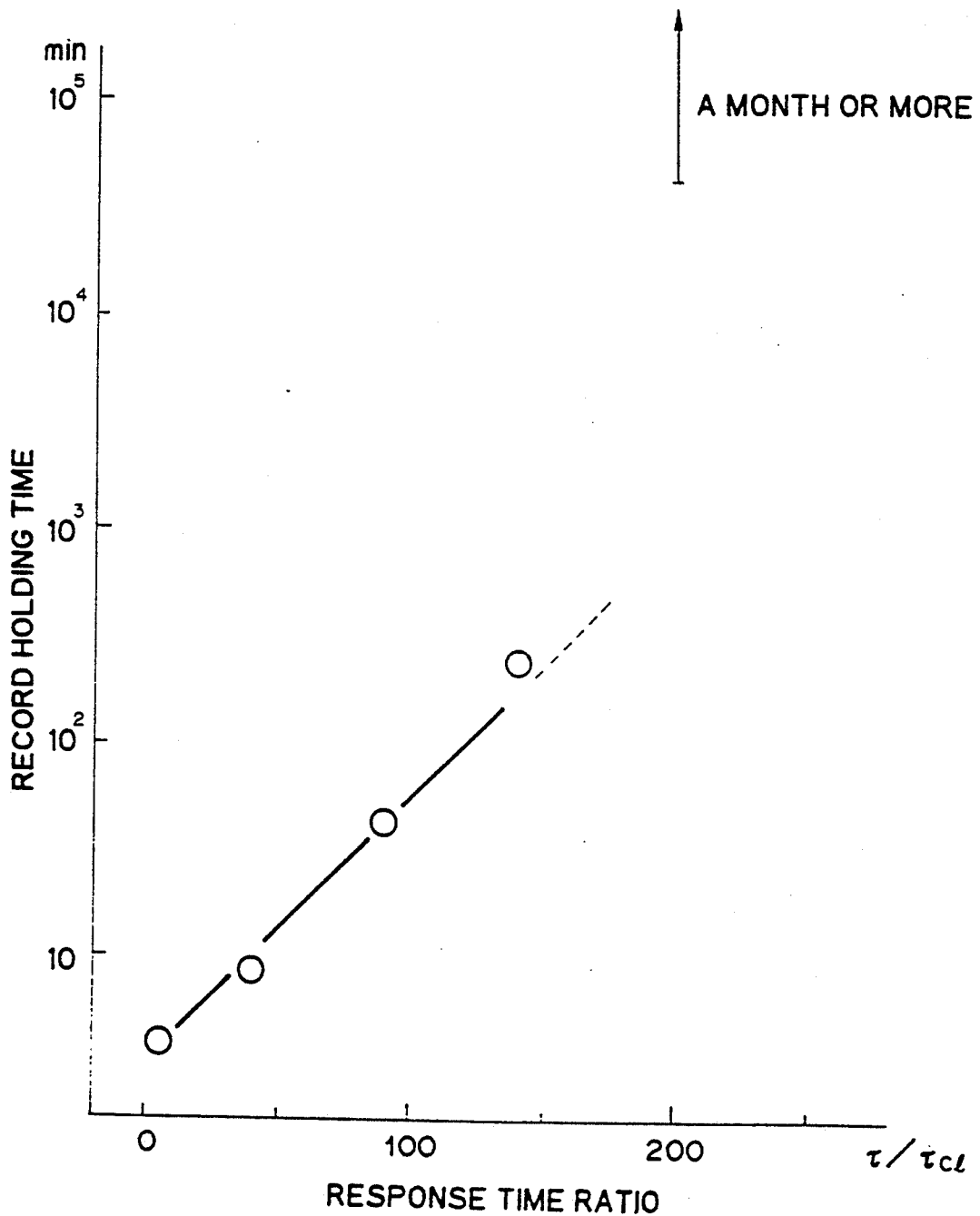
FIG. 10 shows the results obtained in Example 5.

A relation between the record holding time obaserved at each temperature using a polarizing microscope and the response time ratio at that temperature is shown in FIG. 10.

A recorded state is very stably kept over a period of 1 month or more at the electric-field response time ratio corresponding to 200 times or more.

As having been described above, according to the present invention, the information memory medium comprises a recording layer containing a polymeric liquid crystal having a ferroelectric chiral smectic phase on the side of higher temperature than its glass transition temperature, and the electric-field response time of said polymeric liquid crystal changes by the factor of not less than 200 times within a temperature range of the ferroelectric chiral smectic phase. This makes it possible to obtain an information memory medium that can record and erase information at a high speed and is effective for stably keeping a recorded state at room temperature.

The information recording/holding process making use of such an information memory medium is a process that does not utilize a glass transition temperature and can provide a novel process by which the recorded state can be stably kept.

What is claimed is:

1. An information memory medium comprising a recording layer containing a polymeric liquid crystal having a ferroelectric chiral smectic phase in which the electric-field response times at two temperature points selected in a temperature region of said ferroelectric chiral smectic phase differ by a factor of at least 200 times, and a lower temperature point between said two points has a higher temperature than the glass transition temperature of said polymeric liquid crystal, and wherein said polymeric liquid crystal has a high-temperature side transition temperature ranging from 50° to 250° C.

2. An information memory medium according to claim 1, wherein said electric-field response time increases by a factor of at least two-fold per 100° C.

3. An information recording/holding process, comprising the steps of recording information on the information memory medium according to claim 1 in its ferroelectric chiral smectic phase by applying an electric field and of holding the recorded information in a state having no electric-field applied.

4. An information recording/holding process according to claim 3, wherein said step of recording information is carried out at a Curie point of the polymeric liquid crystal.

5. An information recording/holding process according to claim 3, wherein said step of holding information is carried out at a memory holding temperature that is on the side of higher temperatures than the glass transition temperature of said polymeric liquid crystal.

6. An information recording/holding process according to claim 5, wherein said memory holding temperature is within a temperature range of the chiral smectic phase.

7. An information recording/holding process according to claim 5, wherein said memory holding temperature is in the range of 25° C. to 35° C.

8. An information recording/holding process according to claim 3, wherein said step of recording information is carried out under an elevated temperature.

9. An information recording/holding process according to claim 3, wherein recording of said information is carried out by changing its optical property to a different state by arranging the direction of a spontaneous polarization along the electric field.

10. An information recording/holding process according to claim 5, wherein said memory holding temperature is lower than the lower point of temperature between said two temperature points, at which temperature the response time is slower by a factor of at least 200 times that at a higher temperature.

* * * * *

UNITED STATES PATENT AND TRADEMARK OFFICE
CERTIFICATE OF CORRECTION

PATENT NO. : 5,316,806
DATED : May 31, 1994
INVENTOR(S) : KAZUO YOSHINAGA, ET AL.

It is certified that error appears in the above-identified patent and that said Letters Patent is hereby corrected as shown below:

ON TITLE PAGE

In [56] References Cited, under FOREIGN PATENT DOCUMENTS:
"63-153216  7/1985  Japan" should read
--62-012937  1/1987  Japan--;
"62-154340  7/1989  Japan" should read
--62-154340  7/1987  Japan--.

COLUMN 9

Formula (18), "HO—" should read --H— --.

COLUMN 11

Formula (27), "(12 = 5~18)" should read --($l_2$= 5~18)--.
Formula (28), "(12 = 5~18)" should read --($l_2$= 5~18)--.
Formula (29), "(12 = 5~18)" should read --($l_2$= 5~18)--.
Line 67, "compound," should read --compounds,--.

COLUMN 15

Line 61, "van-" should read --varn- --.

COLUMN 16

Line 1, "costing," should read --coating,--.

UNITED STATES PATENT AND TRADEMARK OFFICE
CERTIFICATE OF CORRECTION

PATENT NO. : 5,316,806
DATED : May 31, 1994
INVENTOR(S) : KAZUO YOSHINAGA, ET AL.

It is certified that error appears in the above-identified patent and that said Letters Patent is hereby corrected as shown below:

COLUMN 17

Line 60, "oba-" should read --ob- --.

Signed and Sealed this

Twenty-seventh Day of December, 1994

Attest:

BRUCE LEHMAN

Attesting Officer     Commissioner of Patents and Trademarks